_United States Patent_ [19]

Wen

[11] Patent Number: 4,520,477
[45] Date of Patent: May 28, 1985

[54] CONTROL INFORMATION COMMUNICATION ARRANGEMENT FOR A TIME DIVISION SWITCHING SYSTEM

[75] Inventor: Wilson K. Wen, Middletown, N.J.

[73] Assignee: AT&T Bell Laboratories, Murray Hill, N.J.

[21] Appl. No.: 507,779

[22] Filed: Jun. 27, 1983

[51] Int. Cl.³ ............................................ H04Q 11/04
[52] U.S. Cl. .................................. 370/58; 370/110.1; 370/111
[58] Field of Search ...................... 370/58, 110.1, 111

[56] References Cited

U.S. PATENT DOCUMENTS

| | | | |
|---|---|---|---|
| 3,748,393 | 7/1973 | Baxter | 370/111 |
| 4,213,201 | 7/1980 | Gagnier et al. | 370/62 |
| 4,296,492 | 10/1981 | Hafer | 370/14 |
| 4,322,843 | 3/1982 | Beuscher et al. | 370/58 |
| 4,382,294 | 5/1983 | Beuscher et al. | 370/58 |

FOREIGN PATENT DOCUMENTS 165483 12/1981 Japan .
2063018 5/1981 United Kingdom ................ 370/111

_Primary Examiner_—Douglas W. Olms
_Assistant Examiner_—Kenneth I. Rokoff
_Attorney, Agent, or Firm_—Kenneth H. Samples

[57] ABSTRACT

A time division switching system having a time-space-time architecture is disclosed. The time-multiplexed communication links of this system comprise a plurality of channels certain of which are used to convey control information and the remaining ones of which are normally used to convey digital representations of subscriber signals. When a large quantity of control information must be exchanged, the system preempts selected channels from conveying digital representations of subscriber signals and uses these preempted channels to convey the large quantity of control information.

9 Claims, 8 Drawing Figures

CONTROL INFORMATION COMMUNICATION ARRANGEMENT FOR A TIME DIVISION SWITCHING SYSTEM

TECHNICAL FIELD

This invention relates to time division switching systems and more particularly to arrangements for communicating control information within such systems.

BACKGROUND OF THE INVENTION

Stored program controlled communication switching systems comprise some form of intelligence which controls switching functions in response to a program stored in memory. Historically, such systems included a single processing entity for the control of the entire system. As technology and system design evolved, it was found desirable to separate certain routine functions from the main processing entity to save its processing time for more complex system functions and decisions. Today, systems are being designed which also separate some of the more complex system functions and decisions into several intelligent processors. Throughout the evolution of switching system control strategies, changes have occurred in the way the various processing entities intercommunicate. Some systems have provided a separate controller bus structure to be used for all communications among the processors. Other systems have utilized the communication paths of the switching network to provide communication paths between the distributed system processors and a central controller which interprets control information and directs the overall operation of the switching system.

The systems which communicate control information using the switching network communication paths generally preempt permanently a small number of recurring time separated channels from conveying speech representations or data and use them to convey control information. A large number of such channels cannot be permanently preempted without affecting substantially the capacity of the switching system. The small number of permanently assigned channels provide sufficient information transfer capacity for the routine operation of the switching system. However, when large amounts of information are to be transmitted, the capacity may prove insufficient. For example, when a large program needs to be written into the memory of a distributed processor, e.g., a program update, too much time may elapse before the write operation is completed. Further, utilizing all of the control information conveying channels may preclude the distributed processor from performing its function of controlling a part of the switching system.

It is an object of the present invention to provide a high capacity control information communication system for conveying large amounts of data utilizing the communication paths of the switching network between a central controller and a distributed processor the use of which does not terminate the distributed processor's ability to control the switching system.

SUMMARY OF THE INVENTION

A time division switching system in accordance with the present invention comprises a time-shared space division switch having input and output ports for completing communication paths between the input and output ports in time slots, a plurality of communication units each connected to a plurality of signal-generating subscriber stations and to predetermined ones of the input and output ports for transmitting and receiving digitized representations of subscriber station signals, and control information communication arrangements for preempting predetermined time slots from conveying digital representations of subscriber signals and for transmitting first control information in the preempted time slots. Additionally, each of the communication units includes a control arrangement, an arrangement for receiving the first control information from the preempted time slots and an arrangement for transmitting first control information found in the preempted time slots to the control arrangement.

In accordance with one aspect of the present invention, a control information communication arrangement for a time division switching system comprises a first time-multiplexed line conveying digital information in time-separated channels predetermined ones of which are used to convey first control information, a time-slot interchanger for receiving digital information in the time-separated channels and for transmitting digital information so received in channels of a second time-multiplexed line, and a control unit for controlling the operation of the time-slot interchanger. The arrangement further includes first gating circuitry connected to the first time-multiplexed line for gating the first control information from the channels of the first time-multiplexed line to the control unit and for gating the information conveyed by the remaining channels on the first time-multiplexed line to the time-slot interchanger and second gating circuitry for gating digital information from selected channels of the second time-multiplexed line to the control unit.

BRIEF DESCRIPTION OF THE DRAWING

A more complete understanding of the present invention may be obtained from a consideration of the following description when read in conjunction with the drawing in which.

GENERAL DESCRIPTION

Figure 1:
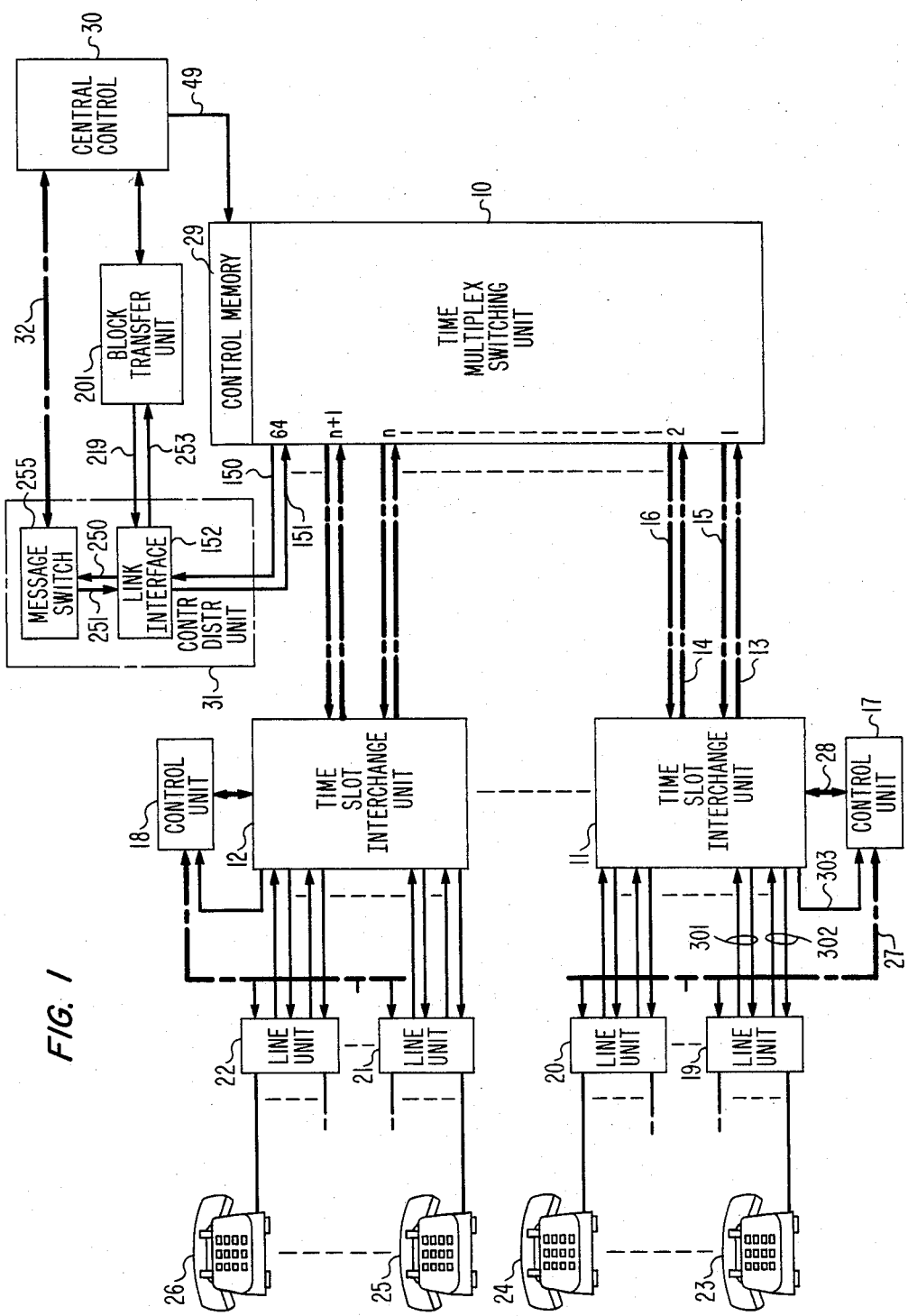
FIG. 1 is a block diagram of a time division switching system embodying the present invention

FIG. 1 is a block diagram of a time division switching system embodying the present invention which is used to interconnect subscriber sets such as subscriber sets 23 through 26. The embodiment of FIG. 1 includes a time multiplex switching unit 10 which comprises a time-shared space division switch having 64 input ports and 64 output ports. The embodiment further includes 31 time-slot interchange units of which representative time-slot interchange units 11 and 12 are specifically shown. Each time-slot interchange unit 11 and 12 includes a bidirectional time-slot interchanger. Additionally, each time-slot interchange unit 11 and 12 is connected to two input ports and two output ports of time multiplex switch unit 10. In the present embodiment, time-slot interchange unit 11 is connected to two time multiplex switch input ports via time multiplex lines 13 and 14 and to two output ports, via time multiplex lines 15 and 16.

In the description which follows, the input and output ports of time multiplex switching unit 10 are referred to as input/output port pairs. This term is used since the source for data words to an input port of a given input/output port pair is also the destination for data words from the output port of that pair. As shown in FIG. 1, input/output port pair 1 is associated with time multiplex lines 13 and 15. Each time multiplex line 13 through 16 conveys digital information in 125 microsecond frames each comprising 256 time separated channels. Accordingly, each time-slot interchange unit 20 transmits and receives up to 512 channels of digital information during each 125 microsecond frame.

Each time-slot interchange unit is uniquely associated with a control unit of which control unit 17 is associated with time-slot interchange unit 11, and control unit 18 is associated with time-slot interchange unit 12. Additionally, each time-slot interchange unit is connected to a plurality of line units of which line units 19 through 22 are shown in FIG. 1 via individual time multiplex lines. In the present embodiment line units 19 and 20 are connected to time-slot interchange unit 11 and line units 21 and 22 are connected to time-slot interchange unit 12. Each of the line units of the present embodiment is connected to a number of subscriber sets of which subscriber sets 23 through 26 are shown. The exact number of line units associated with each time-slot interchange unit and the exact number of subscriber sets associated with each line unit is determined by the number of subscribers to be served and the calling rates of those subscribers. Each line unit terminates the analog loop of the well-known type from a plurality of subscriber sets, e.g., 23 through 26, and converts call information including analog speech signals into digital data words which are transmitted to its associated time-slot interchange unit. Further, each line unit detects service requests from the subscriber sets and generates certain signaling information for those subscriber sets. The particular subscriber sets from which speech samples are taken and encoded, and the particular time multiplex channels used to transmit the resulting code between the line unit and its associated time-slot interchange unit are determined by the control unit of the associated time-slot interchange unit.

Figure 8:
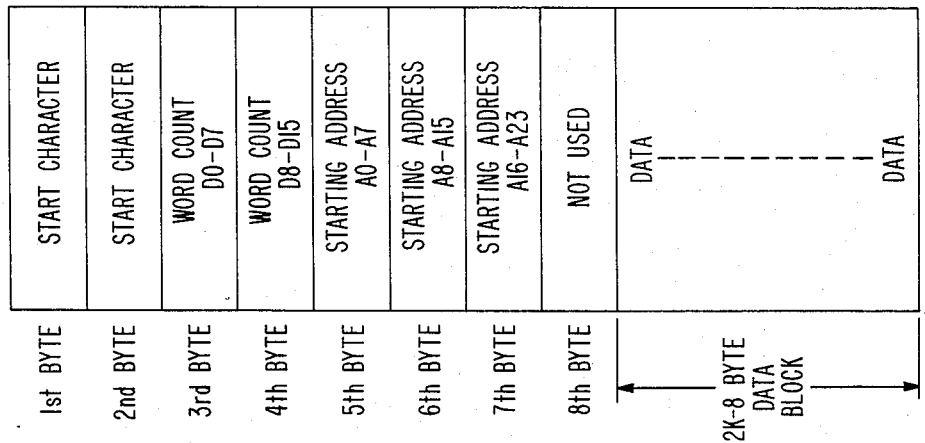

The relationship of subscriber sets, line units and time-slot interchange units is substantially the same for each of such groups of interconnected units. Accordingly, while the description which follows relates directly to subscriber set 23, line unit 19 and time-slot interchange unit 11, it shows the relationships for all other groups of such units. Line unit 19 scans the lines connected to each subscriber set to detect requests for service. When such a request is detected, line unit 19 transmits to the control unit 17, a message indicating the request and the identity of the requesting subscriber set. This message is transmitted to control unit 17 via a communication path 27. Control unit 17 performs the necessary translation based on the service requested, the identity of the requesting subscriber set and the available equipment, and transmits a message to line unit 19 via communication path 27 defining which of the plurality of time separated channels between line unit 19 and time-slot interchange unit 11 is to be used to transmit information from subscriber set 23 to time-slot interchange unit 11. Based on this message, line unit 19 encodes the analog information from subscriber set 23 into digital data words and transmits the resulting data words in the assigned channels. In the present embodiment, line unit 19 also transmits in the assigned channel an indication of the DC state, i.e., open circuit, closed circuit, of the subscriber loop associated with subscriber set 23. Each channel in the present embodiment can convey one 16-bit data word. Each data word (FIG. 8) comprises an 8-bit PCM data portion, a 7-bit signaling portion, and a parity bit. The signaling portion is used to convey signaling information about the channel circuit or the subscriber set to which it is connected. For example, the A-bit of the signaling portion is used to transmit the present DC state of the associated subscriber set to the time-slot interchange unit 11.

After a time separated channel between line unit 19 and time-slot interchange unit 11 is assigned to a given subscriber set, control unit 17 detects signaling information from the subscriber set by sampling the information transmitted in the assigned channel. Such sampling operations are performed via a communication path 28. Control unit 17 responds to the signaling information from the subscriber's channel, and to control messages from other control units, e.g., 18, and a central control unit 30, by controlling the time-slot interchange function of the time-slot interchange unit 11. As previously stated, each time multiplex line between a time-slot interchange unit and the time multiplex switch unit 10 has 256 channels each 125 microsecond frame. These channels are assigned numerical designations from 1 to 256 in sequence as they occur. This sequence of channels recurs so that a given channel will be available every 125 microseconds. The time-slot interchange function takes the data words received from the line units and places them in channels on the time multiplex line between the time-slot interchange units and the time multiplex switching unit 10 under the control of control units 17 and 18.

Time multiplex switching unit 10 operates in recurring frames of time slots where each 125 microsecond frame comprises 256 time slots. During each time slot, time multiplex switching unit 10 is capable of connecting data words received at any of its 64 input ports to any of its 64 output ports in accordance with time-slot control information stored in a control memory 29. The pattern of connections through time multiplex switching unit 10 repeats itself every 256 time slots and each time slot is assigned a numerical designation in sequence from 1 to 256. Accordingly, during a first time slot TS 1 the information in a channel (1) on time multiplex line 13 may be switched by time multiplex switching unit 10 to an output port 64 while during the next time slot TS 2 the next channel (2) on time multiplex line 13 may be switched to an output port n. Time-slot control information is written into control memory 29 by the central control 30 which derives this control information from control messages obtained from various control units, e.g., 17 and 18.

Central control 30 and the control units 17 and 18 exchange control messages utilizing selected channels called control channels of the time multiplex lines, e.g., 13 through 16, between the time-slot interchange units and the time multiplex switching unit 10. In the present embodiment, each control message comprises a plurality of control words and each control channel can transmit one control word per frame of 256 time separated channels. The same channel of the two time multiplex lines associated with a given input/output port pair is predefined to be a control channel. Additionally, a given channel is used as a control channel for only one pair of time multiplex lines. For example, if channel 1 is used as a control channel on time multiplex line 13 and the associated time multiplex line 15, no other time multiplex line will use channel 1 as a control channel. During each time slot having the same numerical designation as a control channel, time multiplex switching unit 10 connects the data word occupying that control channel to the 64th output port and connects the 64th input port to the output port associated with the above-mentioned control channel. The following is an example of the operation of the present embodiment when channel 1 is the control channel for time multiplex lines 13 and 15, and channel 2 is the control channel for time multiplex lines 14 and 16. During time slot TS 1 information from control memory 29 defines, among other connections, that the control word in channel 1 of time multiplex line 13 is connected to output port 64 and that the control word in channel 1 at input port 64 is connected to time multiplex line 15. Similarly, during time slot number TS 2, information from control memory 29 defines that the control word in channel 2 of time multiplex line 14 is connected to the output port 64 and that the control word in channel 2 at the input port 64 is connected to time multiplex line 16. When operating in this manner, output port 64 receives from time multiplex switching unit 10 all control words in a channel having the same numerical designation in which they were transmitted to the time multiplex switch. Further, each control channel is connected to receive control words from input port 64 during the time slot having the same numerical designation as their associated control channel. Control words switched to the 64th output port are transmitted to a control distribution unit 31 which temporarily stores them in a location associated with that control channel. The association of control channels with storage locations in control distribution unit 31 identifies the source of the information stored.

Each control message from a time-slot interchange unit comprises a start character, a destination portion, a signaling information portion, and an end character. The destination portion uniquely defines the expected destination of the control message. Control distribution unit 31 interprets the destination portion of each control message to determine the proper destination for the control message and retransmits the message to input port 64 of time multiplex switching unit 10 in a channel having the same numerical designation as the control channel associated with the destination unit.

When operating as above described, the time-slot interchange unit 11 transmits control messages to time-slot interchange unit 12 by transmitting control words during its recurring control channel to form a control message having a destination portion identifying time-slot interchange unit 12. Control distribution unit 31 accumulates the control words, interprets the destination portion, and retransmits the message to the input port 64 during the channel having the same numerical designation as the control channel associated with time-slot interchange unit 12. A control message can also be transmitted to the central control 30 by defining central control 30 in the destination portion of the control message. When this occurs, control distribution unit 31 transmits the message to central control 30 via a communication line 32 rather than returning it to the time multiplex switching unit 10. Similarly, a message may be transmitted from central control 30 to one of the time-slot interchange units by transmitting to the control distribution unit 31 a control message having a destination portion defining the particular time-slot interchange unit. This transmission is also accomplished utilizing communication link 32. A detailed description of the arrangement discussed above can be found in E. H. Hafer U.S. Pat. No. 4,296,492.

BULK INFORMATION TRANSFER ARRANGEMENT

Figure 3:
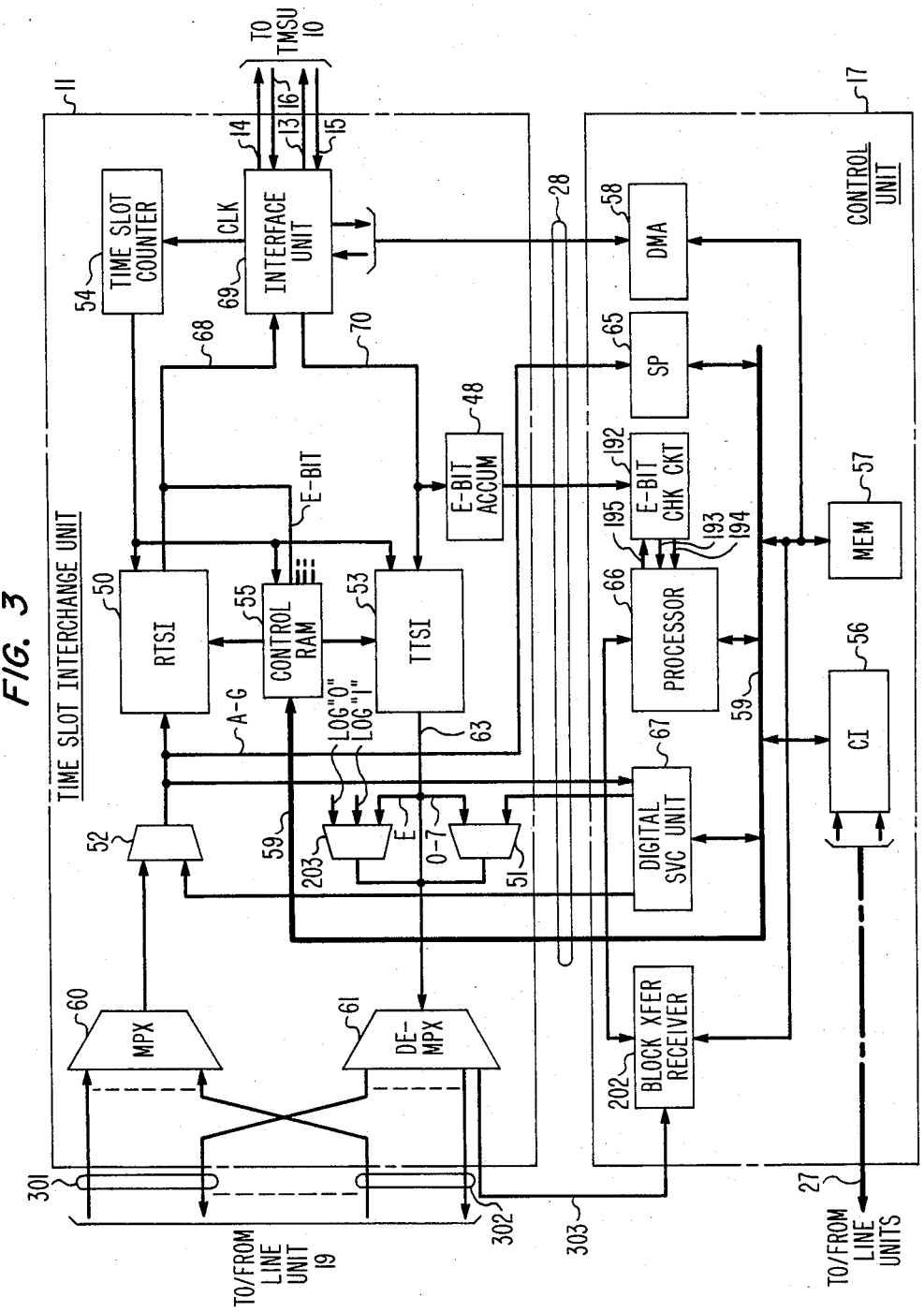
FIG. 3 is a block diagram of a time-slot interchange unit utilized in the embodiment of FIG. 1

In the present embodiment, only two control channels are available at each control unit. These control channels are permanently assigned to individual control units making relatively simple communication interfaces possible. For example, the time multiplex switch unit 10 continuously routes control words to the appropriate time-slot interchange units, and a link interface 69 (FIG. 3) automatically and continuously transmits and receives control words directly from the time multiplex lines connecting the time-slot interchange unit to the time multiplex switch unit. Such a dedicated system provides a readily available communication arrangement, the capacity of which is adequate for the normal demands of inter-control unit communications. However, when large amounts of information must be transferred, a great deal of time is required to transfer it at the rate of one or two control words every 125-microsecond frame. The following is a description of the embodiment of FIG. 1 as it is used for transferring large amounts of information from central control 30 to the individual control units, e.g., 17. It will be remembered that each time multiplex line, e.g., 13, 15, connected between time multiplex switch unit 10 and a time-slot interchange unit, e.g., 11, comprises 256 channels for conveying information and that one of these channels is dedicated for conveying control information. The remaining channels are used to convey subscriber speech representations or data. In accordance with the present embodiment, 32 of the normally subscriber information conveying channels can be temporarily used for bulk information transfer. These 32 channels which advantageously comprise every 8th channel, are called block transfer channels herein. When a large information transfer is initiated, central control 30 transfers the information to be transmitted to a given control unit in blocks each comprising 2,048 bytes to a block transfer unit 201. In the course of the following description, the term 2k will be used to represent the number 2,048. Block transfer unit 201 receives timing information on a conductor 253 from control distribution unit 31 and is connected to a link interface 152 of control distribution unit 31 in a manner described in detail later herein. It will be remembered that input/output port 64 conveys information in frames each comprising 256 channels and that at most 62 of those channels are actually conveying control words. Additionally, none of the 62 active channels at input/output port 64 can occur during the block transfer channels. For example, if the block transfer channels comprise the sequence of channels 3, 11, 19, . . . 251 none of the channels of this sequence is used as a control channel for any control unit, e.g., 17, 18. A large information transfer to a given control unit is initiated by central control 30 which may initiate the transfer on its own accord or in response to a request for transfer from a control unit, e.g., 17. Before any data is transferred from block transfer unit 201, central control 30 controls the time multiplex switch unit 10 to connect each channel of the sequence 3, 11, 19, . . . 251 at port 64 to an input/output port associated with the control unit which is to receive the information. Central control 30 exerts such control by transmitting gating control information to control memory 29 via conductor 49. Additionally, central control 30 transmits a control message to the control unit, e.g. 17, which is to receive the block transfer indicating that such a transfer is to take place. Control unit 17 responds to the control message by setting time-slot interchange unit 11 to gate the information in each of the block transfer channels on time multiplex line 15 to a block transfer receiver 202 (FIG. 3) in control unit 17 via conductor 303. Block transfer unit 201 in conjunction with control distribution unit 31 then inserts the bytes of the block transfer information into the block transfer channels on time multiplex line 151. Time multiplex switch unit 10 switches each block transfer channel to time multiplex line 15 from which they are received by time-slot interchange unit 11 and gated to the block transfer receiver 202. Block transfer receiver 202 is connected to the input/output bus system of control unit memory 57 (FIG. 3). The information blocks received by block transfer receiver are stored in memory 57 in a manner described in greater detail later herein. When a block transfer is completed, both the time-slot interchange unit 11 and the time multiplex switch unit 10 are "cleared" with respect to the block transfer channels so that those channels can again be used to convey subscriber signals.

Although the system is designed so that no control channel occurs during a block transfer channel, the block transfer channels can be used to convey subscriber information. Accordingly, when time slots through the time multiplex switching unit 10 are assigned by central control 30, central control 30 assigns the block transfer time slots last. That is, of the 255 channels on a given time multiplex line between a time-slot interchange unit and time multiplex switch unit 10 which are available for conveying subscriber information, the 32 block transfer channels will be the last to be assigned for such communication. When a block transfer is required and some of the 32 block transfer channels are presently assigned for subscriber communication, central control can reassign those channels and terminate conversation utilizing them, or it can avoid the use of the subscriber-utilized channels in a manner described later herein.

BLOCK TRANSFER UNIT

Figure 2:
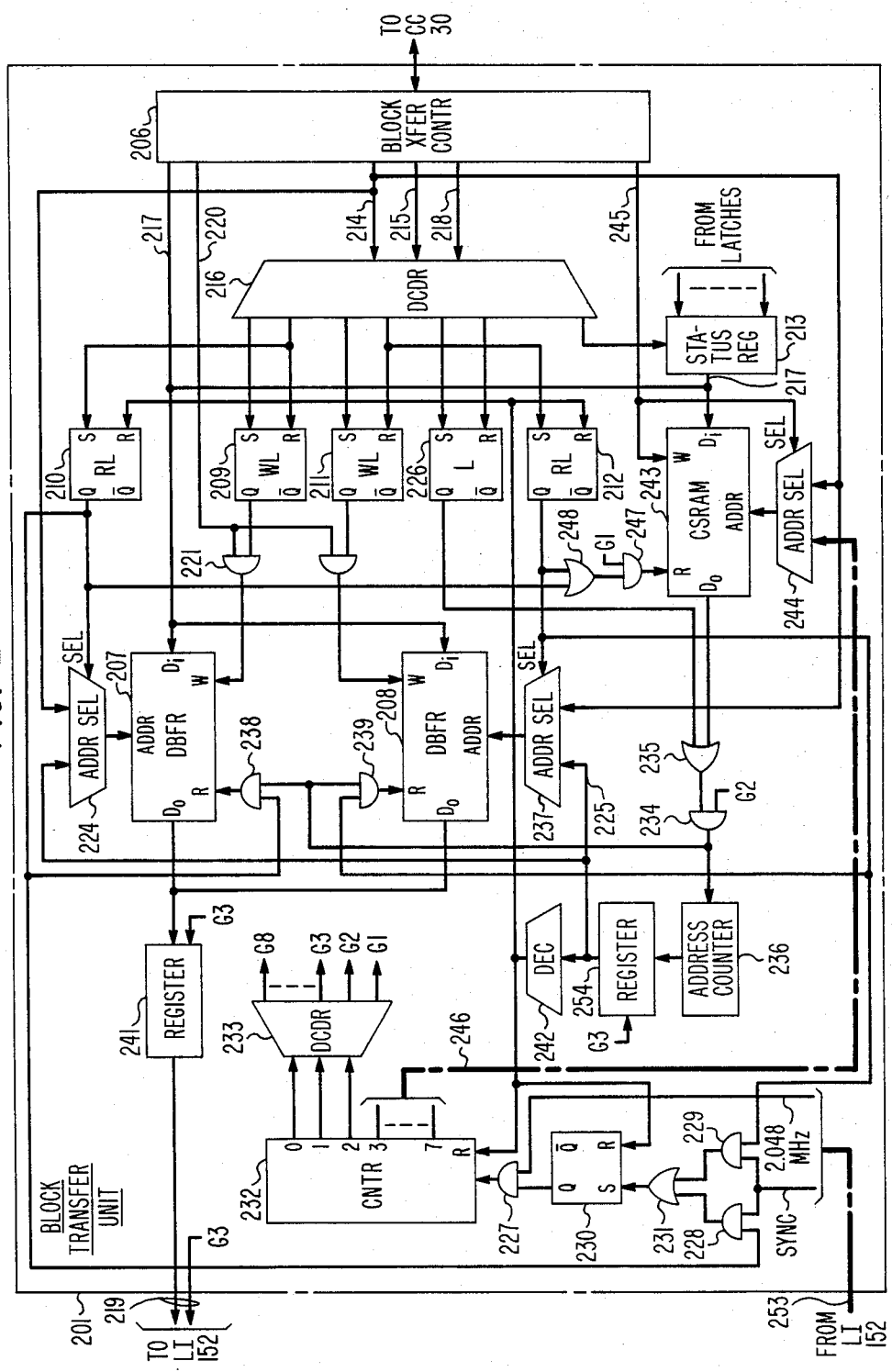
FIG. 2 is a block diagram of a block transfer unit utilized in the embodiment of FIG. 1

FIG. 2 is a block diagram of block transfer unit 201. Block transfer unit 201 receives blocks of information from central control 30 and reformats those blocks of information for transmission on a communication path 219 to the control distribution unit 31. The information transmitted on communication path 219 comprises up to thirty-two 16-bit channels of information, each of those channels being aligned with the unused block transfer channels on time multiplex line 251 from message switch 255 (FIG. 1). Block transfer unit 201 comprises two data buffer memories 207 and 208, and certain control circuitry associated with each of the buffer memories. In operation, 2k blocks of data are alternately written into one data buffer memory while the other data buffer memory is being read, so that rapid data transfer rates can be maintained. In the initial part of the description which follows, the operations relating to data buffer memory 207 are described.

When a large information transfer is to occur, central control 30 transmits to block transfer unit the data to be transmitted to a particular control unit in blocks of 2k 8-bit bytes. This data is received and stored in a block transfer controller 206. The data stored in block transfer controller 206 will be transmitted to one of the two data buffers 207 and 208. Data buffer, 207, has an associated write latch 209 and an associated read latch 210 and data buffer 208 has an associated write latch 211 and an associated read latch 212. The state of these latches controls in part the operation of the associated data buffer and indicates when the associated data buffer is being written into or read from. A status register 213 reflects the states of latches 209 through 212. When a data block is to be transmitted to a data buffer, block transfer control 206 reads the contents of the status register 213 and selects an available data buffer based on those contents. Block transfer control 206 reads status register 213 by transmitting the address of status register 213 on an address bus 214 and a logical "1" on input/output read enable lead 215 to a decoder 216. Decoder 216 receives the address on bus 214 and a logical "1" on conductor 215 and in response thereto gates the contents of status register 213 onto data bus 217 from which it is read by block transfer control 206. Similarly, latches 209 through 212 can be set or reset by transmitting an address defining the set or reset input of the particular latch, and transmitting a logical "1" input/output write enable signal on conductor 218.

Block transfer control 206 after selecting a particular data buffer, e.g. 207, sets the write latch 209 associated therewith via decoder 216. The Q output of write latch 209 is connected to one input of an AND gate 221, the other input of which is connected to a memory write conductor 220 from block transfer control 206. The output of AND gate 221 is connected to the write control terminal of data buffer 207. Data buffer 207 receives addresses from an address selection circuit 224, the input terminals of which are connected to the address bus 214 and a bus 225 from a read address register 254. Address selection circuit 224 is connected to the Q output terminal of read latch 210 and is controlled by the state of that latch. When read latch 210 is in the set state, addresses from bus 225 are connected to data buffer 207. Alternatively when read latch 210 is in the reset state, addresses from address bus 214 are connected to data buffer 207. By means described in greater detail later herein read latch 210 is in the reset state applying a logical "0" at its Q output terminal. When the appropriate write latch, e.g., 209, has been set, the transfer of the data block from block transfer control 206 to data buffer 207 begins. Block transfer control 206 writes the data bytes into data buffer 207 by transmitting each data buffer address in sequence on address bus 214, the byte to be stored at each address on a data bus 217 and a logical "1" write control signal on conductor 220 for each combination of data and address transmitted. When all 2k bytes have been stored in data buffer 207, block transfer control 206 resets write latch 209 and sets read latch 210 via decoder 216. The state of read latch 210 is utilized to start the reading of data buffer 207 and the transmission of data read therefrom to link interface 152. Further, when all 32 block transfer channels are to be used, block transfer controller sets a latch 226 via decoder 216.

As previously stated, block transfer unit 201 receives timing signals from link interface 152 so that the operation of block transfer unit 201 and the link interface 152 are synchronized. These timing signals comprise a 2.048-megahertz timing signal and an 8-kilohertz series of synch pulses which identify the start of each frame of channels. The 2.048-megahertz timing signal is connected as one input to an AND gate 227 and the 8-kilohertz synch pulses are connected as an input to a pair of AND gates 228 and 229. The second input of AND gate 228 is connected to the Q output terminal of read latch 210 and the second input terminal of AND gate 229 is connected to the Q output terminal of read latch 212. The outputs of AND gates 228 and 229 are connected to the set input of a latch 230 via OR gate 231. Accordingly, when the first 8-kilohertz synch pulse is received by block transfer unit 201 after either read latch 210 or read latch 212 is set, latch 230 will be set and generate a logical "1" at its Q output terminal. The Q output terminal of latch 230 is connected as a second input to AND gate 227. When latch 230 is in the set state, its Q output terminal transmits a logical "1" to AND gate 227 which connects the 2.048-megahertz timing pulses to a counter 232. Counter 232 is an 8-bit binary counter which counts each pulse of the 2.048-megahertz timing pulses. The three least significant digits of counter 232 are connected to a one-out-of-eight decoder 233. The use of the other five digit positions of counter 232 are discussed later herein. Decoder 233 transmits logical "1" signals on one of its eight output conductors, which have been labeled $G_1$ through $G_8$ in response to each combination of the three least significant bit positions from counter 232. By operation of the counter 232 and decoder 233 a logical "1" is applied in a recurring sequence to the conductors $G_1$ through $G_8$. The signals on these conductors are utilized to provide gating and timing signals within the block transfer unit 201. It should be noted, that any given output of decoder 233 receives a logical "1" for approximately the same time period as one channel on time multiplex lines 150 and 151 (FIG. 1) and the logical "1" outputs are in synchronism with the channels on that time multiplex line. For example, logical "1s" are applied to conductor $G_1$ during the channels of the sequence 1, 9, 17 . . . 249 of time multiplex line 151.

It will be remembered that latch 226 is set when all 32 block transfer channels are to be used. The Q output of latch 226 is connected to an AND gate 234 via an OR gate 235. Accordingly, when latch 226 is in the set state, a logical "1" is applied as an input to AND gate 234 from latch 226. The other input of AND gate 234 is connected to the $G_2$ output conductor of decoder 233. The output terminal of AND gate 234 is connected to a 2k address counter 236 which is used to generate a sequence of read addresses for the data buffers 207 and 208. Address counter 236 increments its contents by one each time a logical "1" signal is transmitted from conductor $G_2$ by AND gate 234. Accordingly, counter 236 generates a new address for every eight channels on time multiplex line 151 or 32 addresses each 125-microsecond frame. The addresses generated by address counter 236 are continuously applied to the inputs of register 254. Register 254 is connected to conductor $G_3$ of decoder 233 and stores the outputs of address counter 236 when the logical "1" signal is conveyed by conductor $G_3$. The output signals from register 254 are transmitted via address bus 225 to address selectors 224 and 237 which are associated with data buffers 207 and 208, respectively. As previously discussed, each address selector, e.g., 224, is controlled by the state of an associated read latch, e.g., 210. When the associated read latch is in the set state, an address selector transmits addresses from address bus 225 to its associated data buffer. Alternatively, when a read latch is in the reset state, its associated address selector conveys addresses from address bus 214 to the associated data buffer. In accordance with the present example, read latch 210 is in the set state which controls address select circuit 224 to connect addresses from register 254 to data buffer 207.

The output of AND gate 234 is also connected to two AND gates 238 and 239, the output terminals of which are connected to the read control terminals of data buffers 207 and 208, respectively. The other input terminal of AND gate 238 is connected to the Q output terminal of read latch 210 and the other input terminal of AND gate 239 is connected to the Q output terminal of read latch 212. Accordingly, when a given read latch, e.g., 210, is in the set state, the AND gate, e.g., 238, associated therewith in enabled to connect pulses from AND gate 234 to the read control terminal of the associated data buffer, e.g., 207. The data buffer 207 in response to an address from address bus 225 and a logical "1" pulse at its read control terminal transmits in parallel to a register 241 the data byte in the location defined by the address. The output of register 241 is connected to link interface 152 by conductor 219.

As previously discussed, logical "1s" are applied to a given one of conductors $G_1$ through $G_8$ once every eight channels on time multiplex line 151 in synchronism with those channels. In order to merge the data bytes from block transfer unit 201 with data words from message switch 255, the desired sequence for the block transfer channels must be determined and the appropriate output conductor of decoder 233 to be used to gate the data bytes at the proper time. In the present example, the block transfer channel comprise the sequence of channels 3, 11, 19, . . . 251. Thus, conductor $G_3$ is connected to register 241 to control the output gating from that register. As above described, conductor 219 conveys data bytes in parallel during the channels to be used for block transfer.

In the present example, each data block comprises 2k bytes. A decoder 242 is used to identify the end of a data block. When the contents of register 254 changes from the binary count representing 2047 to the binary count 0, decoder 242 generates a reset pulse which resets read latches 210 and 212, counter 232, and latch 230. Block transfer unit 201 may again transmit data words when appropriate latches are set by block transfer control 206.

Two data buffers 207 and 208 are provided in the present embodiment to speed the block transfer operation. That is, a second 2k block of data can be stored in a second data buffer, e.g., 208, while a first block of data is being read from a first data buffer 207. The functions of reading and writing data buffers then alternate until all of the data has been transmitted. The operation of reading and writing data buffer 208 is substantially identical to the reading and writing of data buffer 207 and is not described in detail herein.

In certain situations, it may not be desirable to transmit data bytes in all of the possible block transfer channels. For example, central control may recognize that certain channels on the time multiplex line between time multiplex switch unit 10 and the time-slot interchange unit which is to receive the data transfer are being used to complete telephone calls. The following is a description of the operation of block transfer and 201 when fewer than all 32 block transfer channels are used. In this situation, central control 30 transmits a message to the control unit associated with the time-slot interchange unit which is to receive the block of data identifying the block transfer channels that are to be used. The use of this information is discussed later herein. Central control 30 also indicates to block transfer control 206 which channels are not to be used for the transfer. Block transfer unit 201 includes a channel select memory 243, which is used to select the proper channels for conveying data bytes of a block transfer when fewer than all 32 channels are used. Channel select memory 243 contains 32 single digit addressable storage locations, each of which is associated with one of the 32 block transfer channels. Channel select memory 243 receives addresses from an associated address selector 244. The control terminal of address selector 244 and the write control terminal of channel select memory 243 are connected to block transfer controller 206 via a conductor 245. When address selector 244 receives a logical "1" from block transfer controller 206 on conductor 245, it gates the address from address bus 214 to the channel select memory 243. Additionally, the data input terminal $D_i$ of channel select memory 243 is connected to data bus 217. Prior to transferring data from block transfer control 206 to a data buffer, e.g., 207, block transfer controller 206 writes each location of channel select RAM 243 when fewer than all of the 32 block transfer channels are to be used. Channel select memory 243 is written by transmitting each address in sequence on address bus 214, the bit to be stored at each address on data bus 217, and a logical "1" on conductor 245 for each combination of data and address transmitted. After the writing operation, each location of channel select memory 243 associated with a channel to be used stores a logical "1" and each location associated with a channel which is not to be used stores a logical "0". Additionally, when fewer than all block transfer channels are to be used, block transfer controller resets latch 226. Accordingly, latch 226 applies a logical "0" to OR gate 235. The other input to OR gate 235 is connected to the data output terminal of channel select memory 243.

When data is to be read from a data buffer, e.g., 207, counter 232 begins receiving 2.048-megahertz pulses as described in the preceding example. Counter 232 counts these pulses and produces at digit positions 3 through 7 a recurring sequence of binary addresses 0 through 31. Since the five most significant bits of counter 232 are used to generate this address sequence, each address of the sequence is present on conductor 246 for a period of time substantially equal to eight channels on time multiplexed line 151. Accordingly, logical "1s" are applied to each conductor $G_1$ through $G_8$ during the application of each address to conductor 246. These addresses are connected via a conductor 246 to the second input of address selector 244. During data buffer read operations, block transfer control 206 transmits a logical "0" on conductor 245 to which address selector 244 responds by gating the addresses from counter 232 to the address input of channel select memory 243. The read control terminal of channel select memory 243 is connected to the output of an AND gate 247. One input terminal of AND gate 247 is connected to the Q output terminals of read latches 210 and 212 via an OR gate 248. The other input terminal of AND gate 247 is connected to conductor $G_1$. Thus, when either of the read latches 210 or 212 is in the set state AND gate 247 transmits the signals on conductor $G_1$ to the read control terminal of channel select memory 243. Channel select memory 243 in response to the addresses on communication path 246 and the logical "1" signals at its read control terminal transmits the bit stored at the specified location via OR gate 235 to one input of AND gate 234. When the accessed location of channel select memory 243 stores a logical "1", AND gate 243 is enabled thereby to convey the logical "1" on conductor $G_2$ to the address counter 236 and to the read control terminal of a selected data buffer. This increments the address generated by address counter 236 and initiates a read by a selected data buffer, e.g., 207. Alternatively, when the accessed location of channel select memory 243 stores a logical "0", AND gate 234 cannot convey the logical "1" on conductor $G_2$ to address counter 236 or the read control terminal of the selected data buffer, e.g., 207. When this occurs, no data byte is read from a data buffer and the outputs of data of the address counter 236 remains unchanged.

Figure 5:
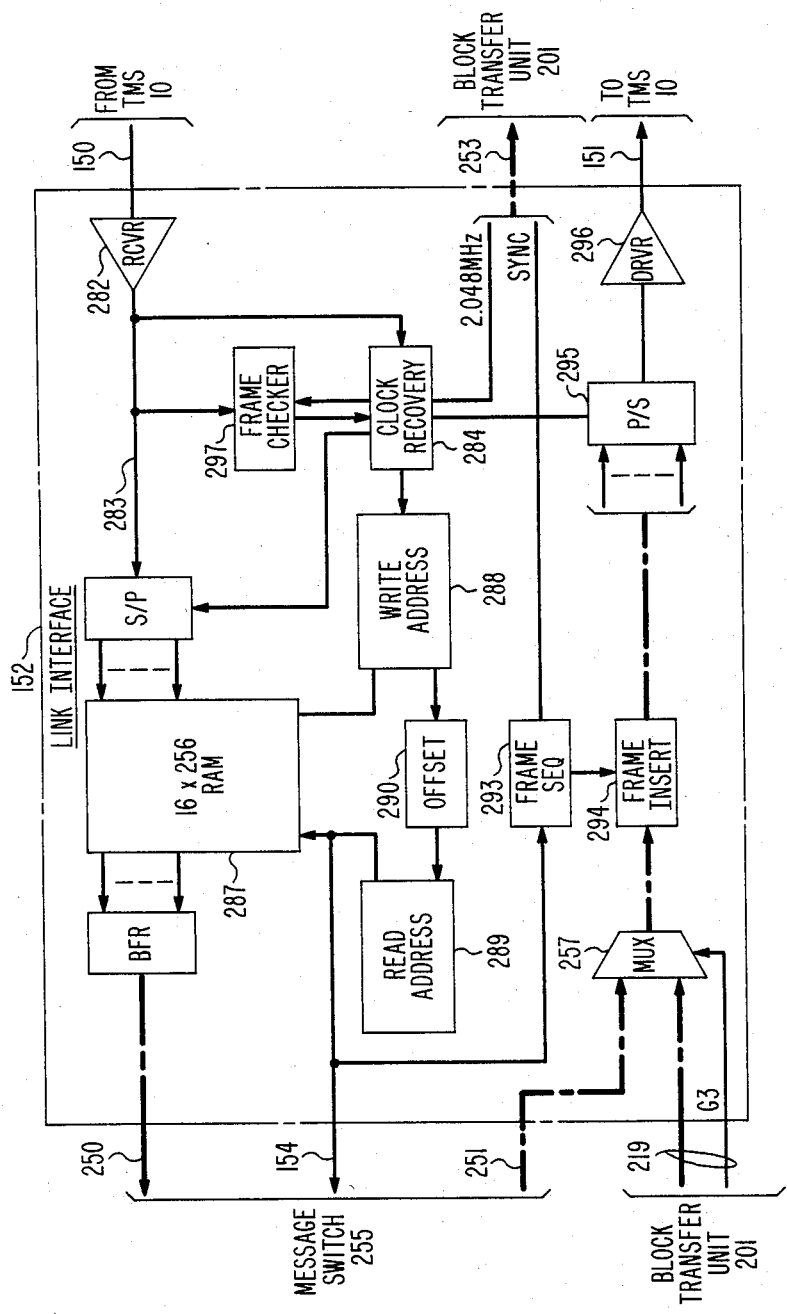
FIG. 5 is a block diagram of a link interface utilized in the embodiment of FIG. 1

The data bytes transmitted on communication path 219 are transmitted to link interface circuit 152 (FIG. 5) where they are merged with the information from message switch 255. Link interface 152 includes a multiplex circuit 257 which receives block transfer channels on conductor 219 from block transfer unit 201, the signals on conductor $G_3$ from block transfer unit 201 and control channels from message switch 255 on conductor 251. The block transfer and control channels are synchronized by the operation of the timing circuitry within link interface 152. Multiplexor 257, in response to each logical "1" on conductor $G_3$, gates block transfer channel from conductor 219 to a frame insert circuit 294. Alternatively, multiplexor 257, in response to a logical "0" on conductor $G_3$ gates the control channel on conductor 251 to the frame insert circuit 294.

Link interface 152 (FIG. 5) includes a receiver 282 which receives data words transmitted serially from time multiplex switch 10 via time multiplex line 150 and serially retransmits this information on a conductor 283. A clock recovery circuit 284 receives the incoming bit stream by connection to conductor 283 and recovers a 32.768 megahertz clock signal therefrom. This clock signal is used to provide timing for the link interface circuit 152, the message switch 255 and the block transfer unit 201. Due to transmission delays through the time multiplex switch 10, the information received on time multiplex line 150 is not necessarily in channel synchronization with that transmitted on time multiplex line 151. In order to achieve channel synchronism between the data words on time multiplex lines 219, 250, and 251, the incoming data words on conductor 283 are buffered in a random access memory circuit 287. The data words on conductor 283 are written into random access memory 287, at a location defined by a write address generator 288. Write address generator 288 receives a 2.048 megahertz clock signal from the clock recovery circuit 284 and in response thereto generates a recurring sequence of 256 write addresses in synchronism with the incoming data words on conductor 283. The 2.048-megahertz clock signal is also transmitted to block transfer unit 201 via a conductor 253 which operates in response thereto as previously described. Data words are read from random access memory 287 for transmission to message switch 255 at locations defined by a read address generator 289 which generates a recurring sequence of 256 read addresses. The read addresses are derived from information received from an offset circuit 290. Offset circuit 290 receives the write addresses generated by the write address generator 288, and effectively subtracts a predetermined number therefrom. The result of this subtraction is then transmitted to read address generator 289. In this manner, read address generator 289 generates a sequence of read addresses which is a predetermined number of addresses behind those generated by the write address generator 288. In the present embodiment, the read address generator 289 is approximately one-fourth of a frame (64 time slots) behind the addresses generated by the write address generator 288. In the present embodiment, the read addresses are also transmitted to message switch 255 to control the timing thereof in a manner described later herein.

Additionally, the read addresses generated by read address generator 289 are transmitted to a frame sequence generator 293. Frame sequence generator 93 responds thereto by generating a unique sequence of framing bits at the rate of one bit per channel. During each channel, the bit generated by the frame sequence generator 293 is transmitted to a frame insert circuit 294 which places the framing bit into the G-bit location of that channel. The data word including this framing bit is then transmitted via a parallel to serial register 295 and a driver circuit 296 to time multiplex line 151 which is connected to input port 64 of time multiplex switch 10. Each data word received by link interface 152 includes a framing bit which is generated and transmitted by the time multiplex switch 10. A frame checker 297 reads each framing bit of each data word from time multiplex switch 10 and determines if the communication between time multiplex switch 10 and itself is still in synchronism. If synchronism exists, no corrections are made; however, if synchronism is found not to exist, reframing is accomplished by communication with the clock recovery circuit 284 in a mannner well known in the art.

CONTROL DISTRIBUTION UNIT

Figure 4:
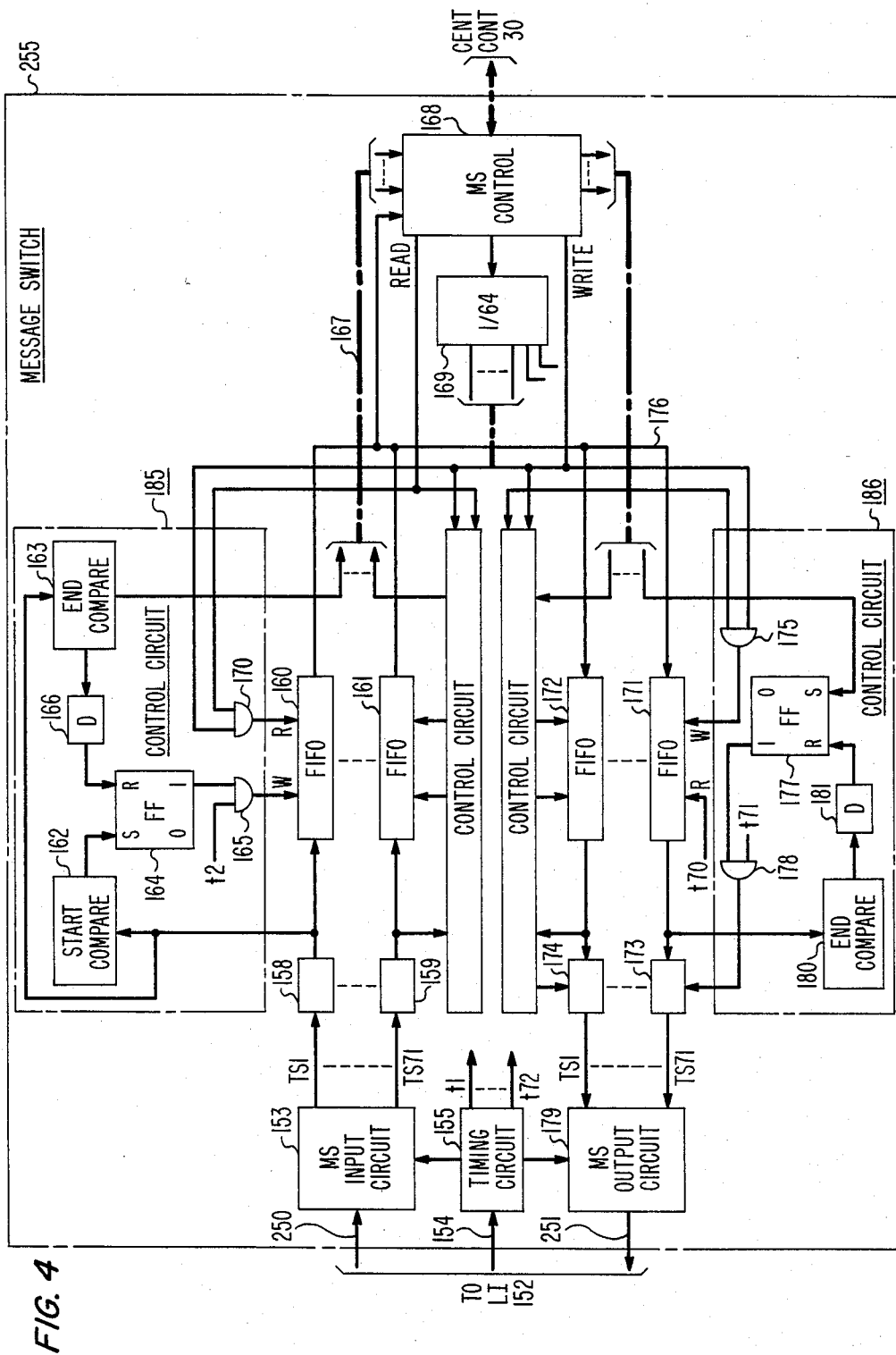
FIG. 4 is a block diagram of a message switch utilized in the embodiment of FIG. 1

Each control time slot is transmitted by time multiplex switch 10 (FIG. 1) to the control distribution unit 31 via time multiplex lines 150 and 151 which are connected to input/output port pair 64. In the course of the following description, control time slots from a given control unit are referred to as transmit control time slots while control time slots to a given control unit are referred to as receive control time slots. The message switch 255 of control distribution unit 31 which switches the control channels is shown in greater detail in FIG. 4. Each control word received on time multiplex line 150 is transmitted in parallel from the link interface circuit 152 to a message switch input circuit 153 in the transmit control time slot associated with that control word. The time slot designation of each control word transmitted to the message switch input circuit 153 is substantially simultaneously transmitted via a communication path 154 to a timing circuit 155. The time-slot designations so transmitted are generated by read address generator 289 of link interface 152. Message switch input circuit 153 is essentially a demultiplexer having one input port and 256 output ports. Each control word received at the input port of message switch input circuit 153 is transmitted to the unique one of 256 output ports defined by the time-slot designation transmitted on communication path 154.

The present embodiment includes thirty-one time-slot interchange units, e.g., 11 and 12, each having access to two transmit and two receive control time slots. Accordingly, the information transmitted to input circuit on time multiplex line 250 includes at most 62 transmit control time slots. Similarly, time multiplex line 251 conveys, at most, 62 control time slots back to multiplexor 257. Message switch input circuit 153 thus requires only 62 active output ports. In order to properly merge control channels from message switch 255 with the block transfer channels from block transfer unit 201, no channel is assigned as a control channel if it is assigned as a block transfer channel. In the present embodiment, block transfer channels have been selected to be the recurring sequence of channels 3, 11, 19, . . . 251. Accordingly, none of these channels is assigned as a control channel. In the present example, channels 1, 2, 4–10, 12–18, 20–26, 28–34, 36–42, 44–50, 52–58, 60–66, and 68–71 are used as control channels. The output port of message switch input circuit 153 associated with time slot TS 1 (channel 1) is connected to a buffer register 158 and the output port associated with time slot TS 71 (channel 71) is connected to a buffer register 159. A similar buffer register is associated with each of the other control channels. The control circuitry 185 associated with transmit control time slot TS 1 is substantially identical to the control circuitry for the remaining 61 transmit control time slots. Accordingly, only the control circuitry 185 associated with time slot TS 1 is described in detail herein. Buffer register 158 is connected to the data input terminal of a first-in /first-out buffer 160 which buffer responds to a logical "1" pulse at its write control terminal W to write into its first storage cell the contents of buffer register 158. In accordance with well-known principles of first-in/first-out buffers, any information placed in the first storage cell "ripples" to the last unoccupied storage cell where it is held until the information is read from the first-in/first-out buffer. First-in/first-out buffer 160 further includes a read control terminal R. In response to a logical "1" pulses at this read control terminal R, the contents of the last memory cell are transmitted from the first-in/first-out buffer and the contents of all other cells of the buffer are shifted one cell toward the output.

It will be remembered that each control message from the time-slot interchange unit, e.g., 11, begins with a start character and ends with an end character. The contents of buffer register 158 are continuously transmitted to a start comparator 162 and an end comparator 163. Start comparator 162 includes a comparison circuit and a register which stores the start character. When the contents of buffer register 158 matches the stored start character, start comparator 162 transmits a logical "1" to the set input of a flip-flop 164. Whenever flip-flop 164 is in the set state, it generates a logical "1" on its logical "1" output terminal which is transmitted to an AND gate 165. The output terminal of AND gate 165 is connected to the write control terminal W of first-in/first-out buffer 160. The other input of AND gate 165 is connected to a terminal $t_2$ of timing circuit 155. Timing circuit 155 transmits from terminal $t_2$ a series of pulses occurring at the rate of one pulse per frame during a time $t_2$ which occurs during time slot TS 2. Timing circuit 155 includes a one out of n decoder which receives the time-slot designations transmitted on communication path 154 and applies a logical "1" pulse to the unique one of its 256 output terminals corresponding to the incoming time-slot designation. The particular one of these terminals which receives the logical "1" pulse during time slot TS 2 is transmitted as signal $t_2$ to the input of AND gate 165.

After the reception of a start character in buffer register 158, a new control word will be placed in buffer register 158 during time slot TS 1 of each frame. Further, each pulse $t_2$ transmitted to control terminal W of first-in/first-out buffer 160 causes the contents of buffer register 158 to be stored in the first storage cell of first-in/first-out buffer 160. This action continues until the end character is stored in buffer register 158.

End comparator 163 includes a comparator circuit and a register storing the end character. End comparator 163 generates a logical "1" output pulse when the character stored in buffer register 158 is found to match the end character stored in end comparator 163. This logical "1" output pulse is transmitted via a delay unit 166 to the reset input of flip-flop 164. Delay unit 166 delays logical "1" pulse for a period of time greater than one time slot. When the logical "1" is received by flip-flop 164, that flip-flop resets causing a logical "0" to be applied to its logical "1" output terminal which inhibits AND gate 165 from transmitting any further $t_2$ timing pulses to the control terminal W of first-in/first-out buffer 160.

End comparator 163 upon the detection of the end character in register 158 also transmits a flag signal to a message switch controller 168 over a bus 167. This flag signal defines that a completed control message has been received by first-in/first-out buffer 160. Message switch control 168, in response to each flag signal from control circuit, e.g., 185, reads the entire control message from the first-in/first-out buffer storing that control message. In the present embodiment, message switch control 168 initiates such a reading operation by transmitting a 6-bit code defining which first-in/first-out buffer contains the control message to be read to a one out of 64 decoder 169. One out of 64 decoder 169 responds to the 6-bit code from the message switch control 168 by applying a logical "1" to an AND gate associated with the read control circuitry of the first-in/first-out buffer storing a control message. In the present example, first-in/first-out buffer 160 is storing a control message. Accordingly, the 6-bit code transmitted to one out of 64 decoder 169 defines AND gate 170 which is associated with first-in/first-out buffer 160. In response to this 6-bit code, one out of 64 decoder 169 transmits a logical "1" to AND gate 170. Additionally, message switch controller 168 transmits a series of pulses at a 2-megahertz rate to the other input of AND gate 170. It should be noted that the series of 2-megahertz pulses is also transmitted simultaneously to equivalent AND gates in the other control circuits. Since AND gate 170 is receiving a logical "1" from decoder 169, the 2-megahertz pulses are transmitted by AND gate 170 to the read control terminal R of first-in/first-out buffer 160. In response to each of these pulses a control word is read from first-in/first-out buffer 160 and transmitted to the message switch controller 168 via a bus 176. When the message switch controller 168 detects an end character in the information it receives from bus 176, it terminates the transmission of the 2-megahertz pulses. Message switch controller 168 includes a memory circuit which is utilized to store each control word read from one of the receive first-in/first-out buffers, e.g., 160 and 161. When a complete control message is received and stored, the message switch controller 168 reads the destination portion of that control message to determine if the control message is to be transmitted to the central control 30 or to one of the control units, e.g., 17 and 18. When the destination portion of the control message defines the central control 30, message switch control 168 reads the control message from its internal storage and transmits that control message to central control 30 via communication path 32. Alternatively, when the destination portion defines a control unit the message switch control 168 computes the particular receive control time slot associated with that defined control unit. The particular receive control time slot is determined from a translation table stored within the message switch controller 168.

Control distribution unit 31 in the present embodiment includes a second plurality of first-in/first-out buffers. The second plurality of first-in/first-out buffers includes one first-in/first-out buffer for each receive control channel although only two, e.g., 171 and 172, are shown. First-in/first-out buffers 171 and 172 are associated with a respective one of output registers 173 and 174. Each first-in/first-out buffer and its associated output register are utilized to transmit control words to the time multiplex switch 10 in the receive control time slot associated with the destination defined by each control message. In the present example, it will be assumed that the control message transferred from first-in/first-out buffer 160 to message switch control 168 is destined for a module which utilizes time slot 71 (TS 71) as a receive control time slot. Message switch control 168 transmits to one out of 64 decoder 169 a 6-bit code uniquely defining the control circuitry 186 associated with first-in/first-out buffer 171. The logical "1" generated by one out of 64 decoder 169 is applied to an AND gate 175 the output terminal of which is connected to the write control terminal W of first-in/first-out buffer 171. Additionally, message switch controller 168 begins to read each control word of the control message and apply it to bus 176 which is connected in common to all of the first-in/first-out buffers, e.g., 171 and 172. Substantially, simultaneously with the transmission of each control word to the first-in/first-out buffers, message switch control 168 transmits a logical "1" pulse to AND gate 175 and the equivalent AND gates in each of the other control circuits. Since only AND gate 175 receives a logical "1" from one out of 64 decoder 169, only it passes the logical "1" pulses from message switch controller 168 to terminal W of its associated first-in/first-out buffer 171. In response to each logical "1" pulse received at its write control terminal W, first-in/first-out buffer 171 writes the control word on bus 176 into its input storage cell. As previously described, these control words "ripple" to the output storage position of the buffer. The read control terminal R of first-in/first-out buffer 171 is connected to timing circuit 155 such that it receives signals $t_{70}$. Accordingly, during each $t_{70}$ time slot, the control word in the last storage position of first-in/first-out buffer 171 is transmitted to the output register 173.

Message switch controller 168 also transmits a start signal to the set input terminal of flip-flop 177 at the beginning of a control message transmission function. The logical "1" output of flip-flop 177 is applied to an AND gate 178, the output terminal of which is connected to the gating control terminal of output register 173. Additionally, AND gate 178 receives as an input the signal $t_{71}$. Thus, after flip-flop 177 is set, a logical "1" pulse is delivered to output register 173 in response to each signal $t_{71}$. Each control word transmitted to output register 173 is transmitted to a message switch output circuit 179 during the time slot TS 71 in response to the $t_{71}$ pulses. Prior to the setting of flip-flop 177, no signals are gated to message switch output circuit 179.

Each control word read from first-in/first-out buffer 171 is also applied to the inputs of an end compare circuit 180 which is substantially identical to the end compare circuit 163. When end compare circuit 180 detects that the character being transmitted from first-in/first-out buffer 171 to output register 173 is the end character, it generates a logical "1" pulse which is transmitted via a delay circuit 181 to the reset terminal of flip-flop 177. Delay circuit 181 delays the logical "1" pulse from end compare circuit 180 for a period of time greater than one time slot. In this manner, flip-flop 177 is reset to inhibit the transmission of further $t_{71}$ signals to output register 173 after the transmission of the end character.

Message switch output circuit 179 is a multiplexor having 256 input ports and one output port. The 62 input ports having the same designation as they above-mentioned control channels are each uniquely associated with one of the time-slot output registers, e.g., 173 and 174. In response to time-slot count signals from timing circuit 155 message switch output circuit 179 transmits a control word from one of the output registers, e.g., 173 and 174, to its output port. The output port is connected via conductor path 251 to multiplexor 257 of link interface circuit 152 which operates as previously described to merge the control channels with the block transfer channels and to transmit the result of the merge to time multiplex switching unit 10.

Central control 30 also generates control messages to be transmitted to the control units, e.g., 17 and 18. Each control message generated by central control 30 includes a destination portion defining the particular control unit which is to receive the control message. Control messages are transmitted from the central control 30 to the message switch control 168 via communication path 32. Message switch control 168 stores each control message received from central control 30 and as previously described, reads each stored destination portion to determine the control unit for which the control message is intended. Message switch control 168 transmits control messages from central control 30 in the same manner that it transmits control messages received from the first-in/first-out buffers 160 and 161.

Link interface 152 transmits the merged control channels and block transfer channels to time multiplexed switch unit 10 input/output port 64 via time multiplexed line 151. Time multiplexed switch unit 10 operates under the control of information stored in control memory 29 to switch each control channel to the output port associated with that control channel. The block transfer control channels at input port 64 are not switched to any output port unless a bulk information transfer is occurring. When such a bulk transfer occurs, central control 30 transmits control information to control memory 29 which defines the connection between the block transfer channels at input port 64 and a defined output port which is to receive each block of information. Time multiplexed switch unit 10 then switches each block transfer channel to the time-slot interchange unit, e.g., 11, connected to the defined output port.

TIME-SLOT INTERCHANGE UNIT

The description of the bulk transfers of information continues after the following description of the time-slot interchange units used in the present embodiment. FIG. 3 is a block diagram of time-slot interchange unit 11 and its associated control unit 17. The arrangement of FIG. 3 is representative of all time-slot interchange units and their associated control units. Time-slot interchange unit 11 is connected to each of its associated line units by two time multiplexed lines, e.g., 301 and 302. Time multiplexed lines 301 and 302 each convey 16-bit data words at the rate of 32 data words each frame in both directions. Each time multiplexed line from a line unit to time-slot interchange unit 11 is connected to a multiplex circuit 60. Multiplex circuit 60 receives the output signals from eight line units which signals are reformatted and transmitted on an output time multiplex line 62 having 512 channels for each 125 microsecond frame. Further, multiplex unit 60 converts incoming channels of information from serial to parallel form and the information transmitted in a given channel on time multiplex line 61 is stored in a receive time-slot interchanger 50 in a memory location uniquely associated with that given channel.

The particular memory location into which a given data word is stored is defined by time-slot designation signals generated by time-slot counter 54. Time-slot counter 54 generates a recurring sequence of 512 time-slot designations at the rate of one time-slot designation per time slot. The particular time-slot designation generated during the time slot in which a given data word is received defines the memory location within receive time-slot interchange 50 which is to store that data word. Data words are also read from receive time-slot interchange 50 at the rate of one data word per time slot. The memory address of the data word to be read from receive time-slot interchange 50 during a given time slot is obtained by reading control RAM 55. Control RAM 55 is read once per time slot at an address defined by the time-slot designation from time-slot counter 54 and the quantity so read is transmitted to receive time-slot interchange 50 as the read address for that time slot. Data words read from receive time-slot interchange 50 are transmitted to the time multiplex switch via a time multiplex line 68 and an interface unit 69. Data words from time multiplex switch unit 10 are received by time-slot interchange unit 11 via the interface unit 69 and are applied to time multiplex line 70. Time multiplex line 70 is connected to transmit time-slot interchange 53 which stores the incoming data words in a location defined by an address from control RAM 55. Data words are read from transmit time-slot interchange 53 at the address defined by the time-slot counter 54. Data words so read are transmitted on time multiplex line 63 for transmission to the line unit 19 via a demultiplex unit 61. Demultiplexer 61 receives 512 channels of 16 bits each on time multiplex line 63 which channels normally are connected to eight line units, e.g., 19 and 20. The particular output of demultiplexer 61 which is connected to time multiplex line 63 during each time slot (channel) is defined by a control word read from control RAM 55. In the absence of block transfers, the control words from RAM 55 define a recurring sequence of connections so that data words are distributed to line units, e.g., 19 and 20. One output of demultiplexer 61 is connected via a time multiplex line 303 to a block transfer receiver 202. When a block transfer of information occurs, demultiplexer 61 is used to transfer block transfer channels to the block transfer receiver 202. It should be noted that control RAM 55 may be implemented as a number of control memories each associated with a particular circuit, e.g., transmit time-slot interchange 53. The particular configuration of control memories is not important to the present invention and may vary depending on timing and circuitry requirements within the time-slot interchange unit 11. The general principles of time-slot interchange as performed by the receive time-slot interchange 50, the control RAM 55, the time-slot counter 54 and the transmit time-slot interchange 53 are well known in the art and are not described in greater detail herein. One arrangement for reading and writing data words in time-slot memories is described in detail in U.S. Pat. No. 4,035,584, J. W. Lurtz.

Each data word on time multiplex line 62 is stored in receive time-slot interchange 50 as above described. In addition to storage in time-slot interchange 50 the signaling portion (bits A through G) of each data word received by the time-slot interchange unit 11 is transmitted to a signal processor 65 which is a part of control unit 17 (FIG. 3). Signal processor 65 reduces the real time load requirement of processor 66 by receiving and analyzing bits A through G. For example, signal processor 65 analyzes the A-bit of each data word, which bit indicates the DC state of associated subscriber set, to determine if a subscriber set has gone on-hook or if a valid dial pulse has been sent. When an on-hook status or a dial pulse is detected, the signal processor 65 transmits to processor 66 a signal indicating the information obtained. Processor 66 accumulates the information from signal processor 65 and responds by exercising control over the switching system in a manner to be described in greater detail later herein.

The embodiment of FIG. 3 also includes a digital service unit 67 which receives the data portion of each data word transmitted on time multiplex line 62. Digital service unit 67 is used primarily to receive and analyze tone signals from the subscribers which have been converted by a channel circuit 37 into PCM signals and to transmit tones and signals in PCM format. Digital service unit 67 comprises a memory (not shown) which has at least 65 storage locations to receive data portions of data words from time multiplex line 62. The data portion of each data word read from time multiplex line 62 is written into a location of digital service unit 67 defined by an address read from control RAM 55. Only 64 channels can be actively transmitting information to be utilized by the digital service unit 67. The data words from all other channels are written into the 65th memory location of digital service unit 67 where they are ignored. Digital service unit 67 reads the data words so stored, determines what signals are being received and communicates the identity and nature of those signals to processor 66. Processor 66 determines what action should be taken in response to the received signals.

Digital service unit 67 also transmits tones to the subscriber sets via time multiplex line 63 in the channel associated with that subscriber set. These tones, in PCM form, are transmitted from digital service unit 67 to a first input port of a gating circuit 51 during the time slot associated with the receiving subscriber. The other input port of gating circuit 51 is connected to receive the data portion of each data word read from transmit time-slot interchange 53. A gate control bit is read from control RAM 55 and transmitted to gate circuit 51 during each time slot to define that either the data portion from transmit time-slot interchange 53 or the data portion from digital service circuit 67 is to be transmitted to demultiplexer 61. In the present embodiment a logical "1" gating bit defines the digital service unit 67 as the source of the data portion and a logical "0" defines transmit time-slot interchange 53 as the source.

In addition to transmitting PCM encoded tones to its associated line unit, each time-slot interchange unit can transmit such tones toward time multiplex switch unit 10. This ability exists since, as described in greater detail later herein, audible ring tone for an originating subscriber is generated in the time-slot interchange unit associated with the terminating subscriber. The incoming time multiplex line 62 is connected as one input to a gating circuit 52 which is the point of insertion for tones to be transmitted toward the time multiplex switch unit 10. The other input of gating circuit 52 is connected to an output terminal of the digital service unit 67. Gating circuit 52 and digital service unit 67 operate in the manner previously described with respect to gating circuit 51, to place tones in predefined ones of the time multiplex channels on time multiplex line 62.

The PCM encoded representations of a given tone to be transmitted toward time multiplex switch 10 are placed in the same channel of time multiplex line 62 and are, accordingly, stored in the same addressable location of receive time-slot interchanger 50. In order to apply these tones to a given channel on outgoing multiplex line 68, control RAM 55 is controlled by processor 66 to generate the read address of the tone storing addressable location during the time slot associated with that channel. For example, audible ring tones may be placed in channel 512 of time multiplex line 62 resulting in their storage in the 512th addressable location of receive time-slot interchange 50. Whenever time-slot interchange unit 11 is to transmit audible ring tone in a given channel, processor 66 places the address 512 in the time-slot location of control RAM 55 associated with that given channel. Accordingly, each occurrence of the given channel will receive a PCM representation of audible ringing. When audible ringing is to terminate, processor 66 changes the address stored by control RAM 55 at the time-slot location associated with the given channel.

The primary mode of control information exchange in the present embodiment comprises the transmission of control messages from a source time-slot interchange unit through the time multiplex switch 10 and the control distribution unit 31 and back to the destination time-slot interchange unit. A secondary mode of communication is also used whereby control information with regard to a given call is transmitted from the source time-slot interchange unit to the destination time-slot interchange unit via the time multiplex switch 10 utilizing the time slot assigned for that call. In the present embodiment, the E-bit position of the data word in the call time slot is used for the secondary mode communication. However, it can be seen that any or all of the signaling bits could be used in this secondary communication mode. In the present embodiment, the E-bit serves the dual purposes of communication path continuity check and signal acknowledgment. Control RAM 55 includes an E-bit position in each of its 512 storage locations. During the course of a call, processor 66 controls the digit stored in the E-bit position of each storage location of control RAM 55 associated with the call. As control RAM 55 transmits addresses defining data words to be read from receive time-slot interchange 50, it transmits the stored E-bit on time multiplex line 68 in place of the E-bit stored in receive time-slot interchange 50. This allows the transmission of messages utilizing the E-bit channel between time-slot interchange units. The arrangement in FIG. 3 also includes an E-bit accumulator 48 which receives the E-bit of each data word received on time multiplex line 70. These E-bits are transmitted to an E-bit check circuit 192 by E-bit accumulator 48. E-bit check circuit 192 responds to instructions from processor 66 on conductor 195 to transmit output signals relating to the E-bits of selected data words to processor 66. For example, during communication path establishment, processor 66 instructs E-bit check circuit 192 to survey the E-bit position of a particular channel and to notify processor 66 if a logical "1" is received within a predetermined period of time. When no logical "1" E-bit is found in the specified channel within the predetermined period of time, a discontinuity signal indicating this fact is transmitted to processor 66 via conductor 193. Alternatively, when such a logical "1" is found by E-bit check circuit 192 within the time period, a continuity signal is transmitted to processor 66 via conductor 194. The E-bit check circuit 192 also surveys the E-bit of each active call. When the E-bit of an active call becomes a logical "0" and stays such for a fixed period of time, the above-mentioned discontinuity signal is transmitted to its associated processor 66. Any processor 66 receiving a discontinuity signal transmits a control message to central control 30 indicating this fact.

As previously described, interface unit 69 receives data words from time multiplex line 68 and conveys them to time multiplex switch unit 10 and also receives data words from time multiplex switch unit 10 and transmits them on time multiplex line 70. Time multiplex lines 68 and 70 convey data words at the rate of 512 every 125-microsecond frame. On time multiplex lines 13 through 16 convey data words at the rate of 256 for every 125-microsecond frame. Interface unit 69 compensates for the different data rates by transmitting each channel having an odd time multiplex line 68 designation on time multiplex line 13 and by transmitting each channel having an even time multiplex line 68 designation on time multiplex line 14. Further, interface unit 69 combines data words on time multiplex lines 15 and 16 by alternately transmitting the data words from time multiplex lines 15 and 16 such that data words from time multiplex line 15 are transmitted in the odd numbered channels of time multiplex line 70 while data words from time multiplex line 16 are transmitted in the even numbered channels. Interface unit 69 also transmits control words from control unit 17 in the control channels on time multiplex lines 13 and 14 and receives control words for control unit 17 from the control channels of time multiplex lines 15 and 16. Interface unit 69 and its operation are described in detail in the previously mentioned Hafer patent.

TIME-SLOT INTERCHANGE UNIT DURING BLOCK TRANSFERS

It will be remembered that when a large information transfer is to occur, central control 30 transmits to the control unit which is to receive the information a control message defining the particular ones of the 32 block transfer channels to be used. This control message is received by line interface unit 69 and stored in memory 57 under the control of a DMA unit 58. Processor 66 then reads the control message from memory 57 via data bus 59. It will be remembered that the block transfer channels comprise channels 3, 11, 19 . . . 251 on time multiplexed lines 15 and 16. By the operation of interface unit 69, information in block transfer channels from time-multiplexed line 15 is conveyed by channels 5, 21, 37 . . . 501 of time-multiplexed line 70. Similarly, information in block transfer channels from time-multiplexed line 16 is conveyed in channels 6, 22, 38 . . . 502 of time-multiplexed line 70. Processor 66 responds to a control message from central control 30 identifying the block transfer channels to be used by writing information into control RAM 55 defining which locations in transmit time-slot interchanger 53 the information from each used block transfer channel is to be stored. In the present embodiment, when all block transfer channels are used, the information in those channels is sequentially written into the locations of the sequence 7, 23, 39 . . . 503 of transmit time-slot interchanger 53. Further, when a given block transfer channel is not used, the corresponding location in transmit time-slot interchanger 53 is not used in the block transfer operation. For example, when a block transfer operation uses time-multiplexed line 15 and block transfer channel 19 thereon is not to be used (channel 37 on time-multiplexed line 70), the corresponding location, i.e., 39, in transmit time-slot interchanger 53 can be used for other purposes such as call completion. The locations of transmit time-slot interchanger 53 are sequentially read and transmitted on time-multiplexed line 63 to a demultiplex unit 61. Accordingly, the block transfer channels occupy the sequence of channels 7, 23, 39 . . . 503 on time-multiplexed line 63. Demultiplex unit 61 connects the information on time-multiplexed line 63 to one of the plurality of output ports under the control of information from control RAM 55. In the absence of block transfers, the information from RAM 55 defines a recurring sequence of connections so that data words are distributed to the connected line units, e.g., line unit 19. When a block transfer occurs, processor 66 stores in RAM 55 control information which controls demultiplex unit 61 to gate the information in each block transfer channel on time-multiplexed line 63 to time multiplexed line 303. Time-multiplexed line 303 conveys the block transfer channels to a block transfer receiver 202 which receives the bulk transfer information and transmits it to memory 57 for storage therein.

BLOCK TRANSFER RECEIVER

Figure 6:
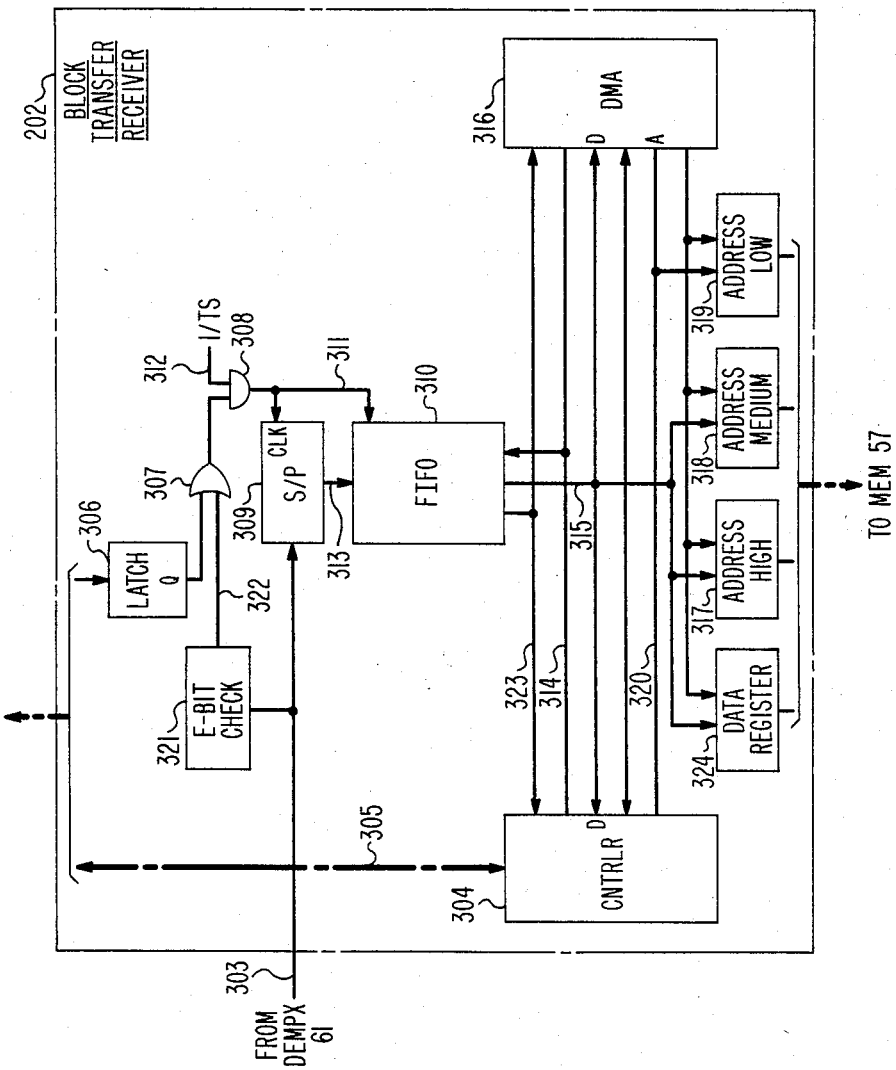
FIG. 6 is a block diagram of a block transfer receiver utilized in the embodiment of FIG. 1
Figure 7:
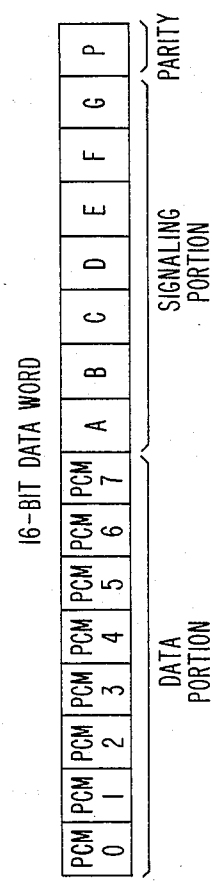
FIG. 7 shows the format of information transmitted during a bulk transfer of information and FIG. 8 is a representation of the 16-bit data words utilized in the present embodiment.

The format of each block of data in a bulk data transfer is shown in FIG. 7. Each block begins with two bytes of unique start characters followed by two bytes which define the length of the data block to be transferred. In the present embodiment, each block transfer comprises 2K bytes of which eight are used in the initialization of the transfer. Accordingly, the data block length bytes always define a 2K-8 byte block. Bytes 5, 6, and 7 define the low-order bits, the medium-order bits, and the high-order bits respectively of the starting address in memory 57 into which the block transfer information is to be written. Following the address bytes is an unused byte. The ninth byte of a block transfer starts the actual block transfer data and is followed by the remainder of the data block. FIG. 6 is a block diagram of block transfer receiver 202 of control unit 17. It is to be understood that the block transfer receiver 202 of each control unit, e.g., 17, 18, is constructed and operates substantially identically. When control unit 17 receives a control message indicating that a block transfer is to occur, processor 66 of control unit 17 enables a controller 304 via a conductor 305. Controller 304 may, for example, be an 8748 microcomputer and its associated memory and input/output interface equipment. Additionally, when all 32 block transfer channels are to be used for the transfer, processor 66 sets a latch 306. In the present example, it is assumed that all 32 block transfer channels are to be used and that processor 66 sets latch 306. The situation where fewer than all 32 block transfer channels are used is described later herein. The Q output of latch 306 is connected via an OR gate 307 as one input to an AND gate 308. The other input of AND gate 308 receives on conductor 312 a series of pulses at the rate of 32 pulses per frame in synchronism with the block transfer channels transmitted on time-multiplexed line 303. The output of AND gate 308 is connected to the gating terminal of a serial-to-parallel register 309 and to the write control input of a first-in/first-out (FIFO) buffer 310 via a conductor 311. When latch 306 is set indicating that all 32 block transfer channels are being used, the logical "1" output of that latch enables AND gate 308 via OR gate 307 to transmit the sequence of pulses on conductor 312 to conductor 311. Serial-to-parallel register 309 receives at its data input the sequence of digits conveyed on time-multiplexed line 303. Serial-to-parallel register 309 responds to each pulse on conductor 311 at its gate control terminal input by transmitting the eight-bit data portion of a block transfer channel to FIFO 310. Similarly, FIFO 310 responds to the pulses on conductor 311 by storing the eight bits from serial-to-parallel register 309. As is well known in the art, any byte stored in a FIFO travels to an output register (not shown) of the FIFO. FIFO 310 generates a logical "1" on conductor 323 whenever a data byte is present in its output register.

Controller 304 upon being enabled by processor 66, clears the internal registers of a DMA controller 316 and loads the mode register and command register with information previously stored in controller 304. Controller 304 also waits for a logical "1" to be transmitted on conductor 323. When a logical "1" is received on conductor 323, controller 304 transmits a read pulse to FIFO 310 via a conductor 314. In response to the read pulse on conductor 314 FIFO 310 transmits the byte in its output register on a data bus 315 from which the byte is received by controller 304. Controller 304 interprets the byte read from FIFO 310 to determine if it is the start character. When the first start character is received, controller 304 waits for the second start character. When the next byte read from FIFO 310 is the second start character, controller 304 loads the following two bytes from FIFO 310 into the word-count register (not shown) of DMA controller 316. Alternatively, when the second start character is not received as the next byte from FIFO 310 after the first start character, a message is transmitted to processor 66 via communication path 305 indicating that a failure has occurred. Similarly, controller 304 transmits a failure message to processor 66 when the first start character is not received by controller 304 within a predetermined period of time after controller 304 is enabled.

DMA controller 316 may, for example, be the advanced microdevices AM9517A multimode DMA controller which is described in detail in the *Advanced Microdevices AM9500 Family Interface Manual,* Copyright 1980. In the description which follows, information and control signals are written into and received from DMA controller 316. This interaction is only generally described herein. Details relating to this interaction are well known in the art. After the word-count bytes have been stored in DMA controller 316, the next three bytes of the block transfer message comprise the low-order, medium-order, and high-order bits of the starting memory 57 address for the block transfer. Twenty-four address bits are required in the present embodiment to define a unique starting location in memory 57. DMA controller 316, however, only has the capability to control 16 address bits. Accordingly, controller 304 writes the low-order and medium-order address bytes into DMA controller 316 and then writes the high-order address byte into an external register 317. The low- and medium-order address bytes are conveyed from FIFO 310 to DMA controller 316 via data bus 315. Similarly, the high-order address byte is conveyed from FIFO 310 to register 317 via data bus 315. The next byte of the output of FIFO 310 is not used, however, it is read by controller 304 to clear the FIFO 310 output register. Further, controller 304 notifies DMA controller 316 to begin transferring data from FIFO 310 to memory 57. DMA controller 316 in response to the notification from controller 304 loads an address register 318 with the medium-order address byte via data bus 315 and loads the low-order address byte into an address register 319 via an address bus 320. DMA controller 316 then begins to survey the state of conductor 323 to determine when the FIFO 310 output register is full. Each time the output register is indicated as full, DMA controller 316 gates the data byte therein to a data register 324 via data bus 315. After the byte is stored by register 321, DMA controller 316 generates a read pulse which gates the data byte in data register 324 and the address bytes in registers 317 through 319 to memory 57 via bus 59. After a byte is transmitted to memory 57, the low-order address bits in register 319 are incremented by DMA controller 316 in preparation for the next byte transfer to memory 57. The process of reading data bytes from FIFO 310 and incrementing memory addresses continues as above-described. When the low-order address bits in register 319 are incremented to all zeroes from all ones, DMA controller 316 increments address register 318 by writing a new address byte therein which is one greater than the immediately preceding address byte. The process proceeds until the number of data bytes transferred to memory 57 equals the word-count (2K-8) stored within DMA controller 316. When this equality occurs, DMA controller notifies controller 304 that the transfer is completed. Controller 304 responds thereto by notifying processor 66 of the completed transfer and assuming a state in which it searches for the start character. Controller 304 remains in the searching state until it is disabled by processor 66 or until a predetermined amount of time passes without finding the start character.

The above description relates to the reception of bulk data transfers where all 32 block transfer channels are used. The operations of the present embodiment are modified when fewer than all 32 block transfer channels are used so that FIFO 310 receives only the information which constitutes the block transfer. When fewer than all 32 block transfer channels are to be used for a bulk data transfer, the E-bits of the contents of the block transfer channels are controlled and used to indicate whether the contents of those channels represent valid block transfer information or not. Time-slot interchange unit 11 (FIG. 3) includes a multiplex circuit 203, the output of which controls the state of the E-bit of each channel on time-multiplex line 63. Under the control of information read from control RAM 55, multiplex circuit 203 conveys the E-bit received from transmit time-slot interchanger 53, a preset logical "1" or a preset logical "0" in each channel transmitted to demultiplexer 61. During normal operation when no block transfer is occurring, control RAM 55 controls multiplexer 203 to gate the E-bit from transmit time-slot interchanger 53 to demultiplexer 61 for each channel. This same situation occurs when all 32 block transfer channels are used to transfer a block of information. However, when a block transfer is to occur and fewer than all the block transfer channels are to be used, multiplexer 203 is utilized to transmit a logical "1" E-bit in each of the block transfer channels used for the bulk information transfer. Additionally, the E-bit of each block transfer channel on time-multiplexed line 63 which is not used as a part of the information transmission is controlled to be a logical "0". For all other channels transmitted on time-multiplexed line 63, the E-bit is unchanged. Processor 66 in response to the control message from central control 30 controls the information stored by control RAM 55 to place a logical "1" in the E-bit position of each block transfer channel to be used during the information transfer and to place a logical "0" in the E-bit position of each block transfer channel which is not being used. Accordingly, each "active" block transfer channel on time-multiplexed line 303 will include a logical "1" E-bit and each "inactive" block transfer channel on time-multiplexed line 303 will include a logical "0" E-bit.

Block transfer receiver 202 (FIG. 6) includes an E-bit check circuit 321. E-bit check circuit 321 checks the E-bit of each incoming channel on time-multiplexed line 303 and transmits a logical "1" on conductor 322 for each channel having a logical "1" E-bit and transmits a logical "0" on conductor 322 for each channel having a logical "0" E-bit. Conductor 322 is connected as a second input to OR gate 307. Processor 66 resets latch 306 at the beginning of each block transfer channel during which less than all of the block transfer channels are to be used. Accordingly, OR gate 307 receives a logical "0" from latch 306. OR gate 307 thus transmits to AND gate 308 a logical "1" for each incoming channel having a logical "1" E-bit and a logical "0" for each incoming channel having a logical "0" E-bit. The logical "0s" transmitted from OR gate 307 to AND gate 308 are used to delete gating pulses on conductor 311 which occur in synchronism with incoming channels having a logical "0" E-bit. That is, no pulse is transmitted on conductor 311 when the data word in serial-to-parallel register 309 has a logical "0" E-bit indicating that it is not a part of the block information transfer. Each of the channels having a logical "1" E-bit indicating that the channel is conveying block transfer information is, however, gated from serial-to-parallel register to FIFO 310 in the manner described above. The reading of FIFO 310 and transmitting data bytes to memory 57 proceeds in accordance with the preceding description whether all block transfer channels are used or fewer than all are used.

It is to be understood that the above-described embodiment is merely illustrative of the principles of the invention and that other arrangements may be devised by those skilled in the art without departing from the spirit and scope of the invention. For example, in the preceding embodiment both block transfer unit 201 and message switch 255 are connected to the same input of time multiplex switching unit 10 via a link interface 152. Block transfer unit 201 and message switch 255 could each be connected to separate input ports of time multiplex switching unit 10 via separate link interfaces 52 within the scope of the present invention.

What is claimed is:

1. A time division switching system comprising
   a time-shared space division switch comprising input and output ports for completing communication paths between selected ones of said input ports and said output ports in time-slots of fixed duration;
   a plurality of communication units each connected to a plurality of signal generating subscriber stations and each communication unit being connected to predetermined ones of said input and output ports for transmitting and receiving digitized representations of subscriber station signals in predetermined ones of said time-slots of fixed duration;
   control information communication means for preempting predetermined ones of said time-slots of fixed duration from conveying digital representations of subscriber station signals and for transmitting first control information in said preempted time-slots; and wherein
   each of said communication units comprises control means, time-slot interchange means for receiving and storing digital representations of subscriber signals and said first control information from said time-shared space division switch in said time-slots of fixed duration and means for transmitting said digital representations of subscriber station signals from said time-slot interchange means to said subscriber stations and means for transmitting said first control information from said time-slot interchange means to said control unit.

2. A time division switching system in accordance with claim 1 further comprising means for terminating the transmission of said first control information in said preempted time-slots and means for returning said preempted time-slots to use in conveying digital representations of subscriber signals.

3. A time division switching system in accordance with claim 1 wherein said control information communication means comprises a source of first control information connected to one of said input ports and means for controlling said time-shared space division switch to connect the one of said input ports connected to said source of said first control information during said preempted time-slots to selected ones of said output ports.

4. A time division switching system in accordance with claim 3 wherein each communication unit further comprises means for transmitting and receiving second control information in second predetermined ones of said time-slots of fixed duration which second predetermined ones of said time-slots of fixed duration are not available to convey digital representations of subscriber station signals.

5. A control information communication arrangement for a time division switching system comprising:
   a first time multiplexed line for conveying digital information in time separated channels thereon, predetermined ones of said time separated channels being used to convey first control information;
   time-slot interchange means;
   a control unit for controlling the operation of said time-slot interchange means;

first gating means connected to said first time multiplexed line for gating said first control information from said predetermined ones of said time separated channels of said first time multiplexed line to said control unit and for gating the information conveyed by the remaining time separated channels of said first time multiplexed line to said time-slot interchange means;

said time-slot interchange means comprising means for receiving information in time separated channels from said first gating means and for transmitting the information so received in time separated channels of a second time multiplexed line; and second gating means for gating digital information from selected ones of said time separated channels of said second time multiplexed line to said control unit.

6. A control information communication arrangement in accordance with claim 5 further comprising means for transmitting second control information in said time separated channels of said first time multiplexed line and wherein said second gating means comprises means for gating said second control information to said control unit.

7. A time division switching system for interconnecting digitized subscriber signals of a plurality of subscriber stations comprising:

a time-shared space division switch having a plurality of input ports and a plurality of output ports for connecting said input ports and said output ports in time slots of fixed duration;

means for transmitting said digitized subscriber signals to said input ports of said time-shared space division switch;

means for transmitting first control information to said input ports of said time-shared space division switch;

a plurality of first time multiplexed lines each connected to one of said output ports for conveying digitized information in time separated channels thereon, predetermined ones of said time separated channels being used to convey said first control information and the remaining ones of said time separated channels being used to convey digitized subscriber signals;

a plurality of time-slot interchange means;

a plurality of control units, each for controlling the operation of an associated one of said time-slot interchange means;

a plurality of first gating means one associated with each of said time-slot interchange means and connected to one of said first time multiplexed lines for gating said first control information from said predetermined ones of said time separated channels of said first time multiplexed lines to the one of said control units associated therewith and for gating the digitized information contained in the remaining time separated channels of said first time multiplexed line to said associated time-slot interchange means;

each said time-slot interchange means comprising means for receiving information in time separated channels from said first gating means and for transmitting the information so received in time separated channels of a second time multiplexed line;

means for transmitting second control information to selected input ports of said time-shared space division switch;

said time-shared space division switch comprising means for transmitting said second control information in selected ones of said remaining time separated channels of a selected one of said first time multiplexed lines, said selected ones of said remaining time separated channels being normally used to convey digitized subscriber signals; and second gating means for gating said second control information from said second time multiplexed line to said control unit for gating digitized subscriber signals on said second time multiplexed line to said subscriber stations.

8. The time division switching system in accordance with claim 7 further comprising means for terminating the transmission of second control information to said selected input ports and means for returning said selected ones of said remaining time-separated channels to use in conveying digitized subscriber signals.

9. A time division switching system in accordance with claim 7 further comprising multiplex means comprising an output terminal connected to one of said input ports and input terminals connected to said source of first control information and said source of second control information for transmitting both said first and said second control information to the same one of said input ports.

* * * * *